(12) United States Patent
Krozek

(10) Patent No.: US 8,104,443 B2
(45) Date of Patent: Jan. 31, 2012

(54) HELICAL CAM DEVICE AND METHOD

(75) Inventor: Jeffrey C. Krozek, Utica, MI (US)

(73) Assignee: Helical Cam, LLC., Algonac, MI (US)

( * ) Notice: Subject to any disclaimer, the term of this patent is extended or adjusted under 35 U.S.C. 154(b) by 756 days.

(21) Appl. No.: 12/129,382

(22) Filed: May 29, 2008

(65) Prior Publication Data

US 2008/0223157 A1    Sep. 18, 2008

Related U.S. Application Data

(63) Continuation of application No. 11/037,419, filed on Jan. 18, 2005, now Pat. No. 7,392,775.

(60) Provisional application No. 60/603,919, filed on Aug. 24, 2004, provisional application No. 60/567,621, filed on May 3, 2004, provisional application No. 60/545,009, filed on Feb. 17, 2004, provisional application No. 60/537,736, filed on Jan. 20, 2004.

(51) Int. Cl.
   *F01L 1/04* (2006.01)
(52) U.S. Cl. .................. 123/90.6; 123/90.21; 74/640
(58) Field of Classification Search .............. 123/90.44, 123/90.6, 90.21, 90.27, 90.31; 74/458, 640, 74/724
See application file for complete search history.

(56) References Cited

U.S. PATENT DOCUMENTS

| 1,850,544 | A |   | 3/1932  | Gray |
|-----------|---|---|---------|------|
| 1,977,828 | A |   | 10/1934 | Laib et al. |
| 2,176,895 | A |   | 10/1939 | Engemann |
| 2,372,559 | A | * | 3/1945  | Edwards ................ 417/259 |
| 2,633,112 | A |   | 3/1953  | Engemann |
| 3,955,241 | A |   | 5/1976  | Little |
| 4,030,161 | A |   | 6/1977  | Loikitz |
| 7,392,775 | B2| * | 7/2008  | Krozek ................ 123/90.21 |
| 7,523,634 | B2| * | 4/2009  | Krozek ................ 72/313 |
| 7,757,533 | B2| * | 7/2010  | Krozek ................ 72/313 |

FOREIGN PATENT DOCUMENTS

WO    0179662 A1    10/2001

* cited by examiner

*Primary Examiner* — Ching Chang
(74) *Attorney, Agent, or Firm* — Reising Ethington P.C.; Michael C. Adams

(57) ABSTRACT

A helical cam device for use with a wide variety of applications generally includes a first cam component, a second cam component and an axial guide. The cam components each have a helical cam track located on an axial end, so that coaxial alignment of the two cam components allows opposing cam tracks to contact and rotate against each other. The helical cam tracks, which are preferably divided into quadrant sections, are designed such that relative rotational movement between the cam components causes a corresponding relative axial movement. According to one embodiment, the axial guide is a cylindrical rod passing through the center of the cam components; in another embodiment, it is a cylindrical sleeve surrounding the cam components. Moreover, barrel slots, detents and/or truncated peaks can be used to control the travel of the cam components.

17 Claims, 2 Drawing Sheets

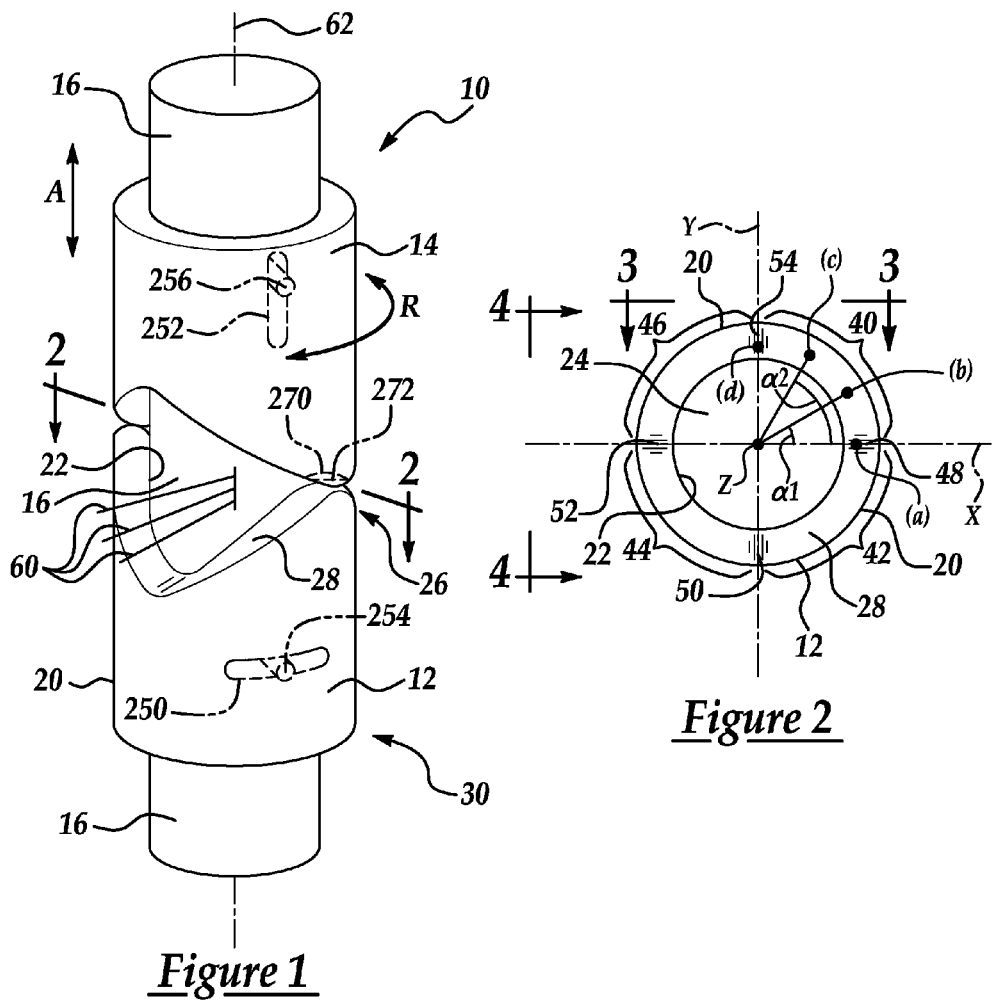
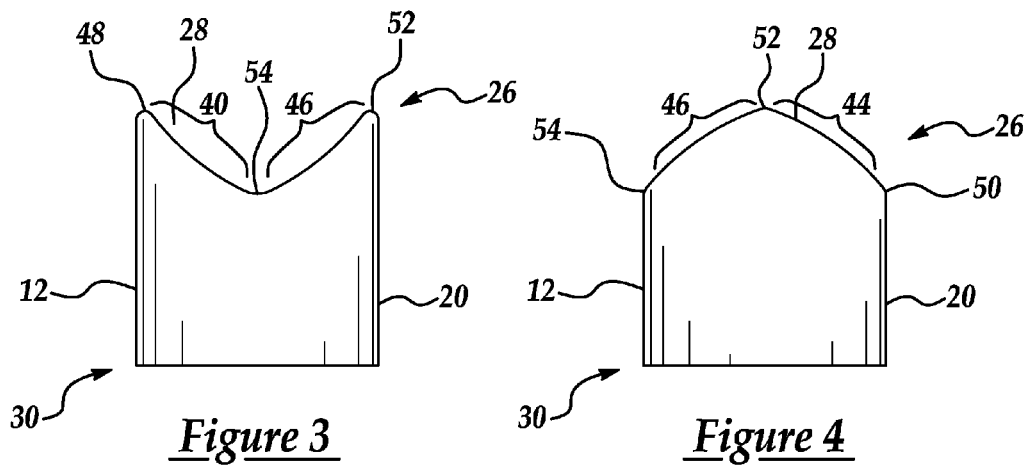

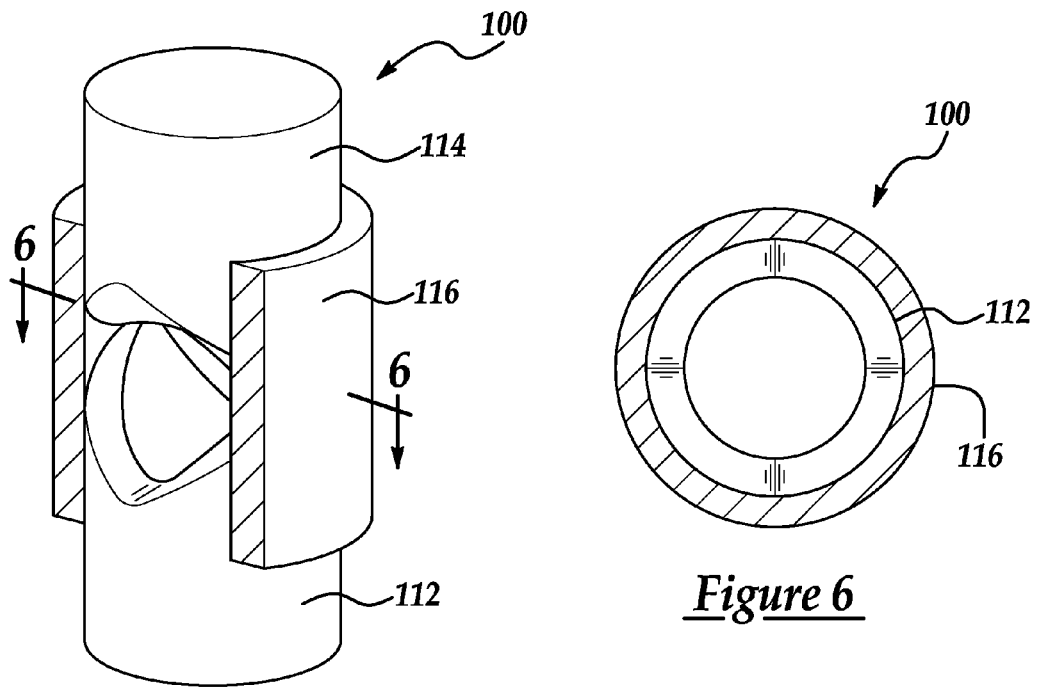
*Figure 5*
*Figure 6*
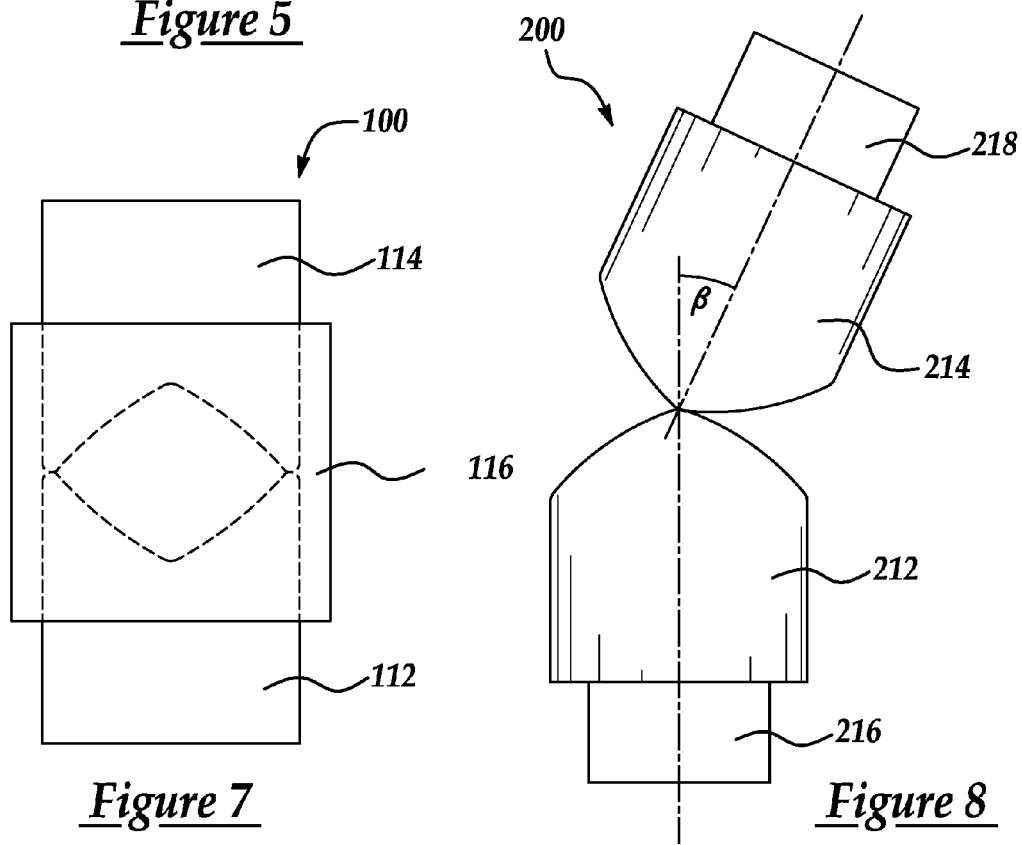
*Figure 7*
*Figure 8*

HELICAL CAM DEVICE AND METHOD

REFERENCE TO RELATED APPLICATIONS

This application is a continuation of copending U.S. application Ser. No. 11/037,419 filed Jan. 18, 2005, and this application claims the benefit of U.S. Provisional Application Nos. 60/537,736, filed Jan. 20, 2004; 60/545,009, filed Feb. 17, 2004; 60/567,621, filed May 3, 2004; and 60/603,919, filed Aug. 24, 2004.

TECHNICAL FIELD

The present invention relates generally to cams, and more particularly, to cam devices having at least two cam components generally coaxially aligned such that opposing cam surfaces can convert rotational movement into axial movement, and vice-versa.

BACKGROUND OF THE INVENTION

Cams and cam surfaces have been employed in a wide variety of applications, including hinges, valves, mechanical switches, carburetors, transmissions, metal forming machines and internal combustion engines, to name but a few. Furthermore, they have been built according to a broad range of designs. Some designs have a cam surface at an axial end of a cam component, while others have a cam surface along a portion of the longitudinal length of the cam component. In most cases, movement by a first cam component causes a resultant movement in one or more second cam components.

One example of an application using a cam device is shown in U.S. Pat. No. 3,955,241, issued May 11, 1976 to Little. This patent discloses a counterbalance hinge mechanism for a cabinet lid that includes a stationary hinge rod for rotatably supporting a pair of lid mounting cam members, and slidably supporting a pair of non-rotatable cam followers. An adjustable spring assembly serves to bias the cam followers into engagement with the cam members, in order to counterbalance gravity induced torque effects of the lid throughout a substantial portion of lid opening movement.

SUMMARY OF THE INVENTION

In accordance with one embodiment, there is provided a helical cam device having first and second cam components and an axial guide. The first cam component has an axial end with a first helical cam track, the second cam component has an axial end with a second helical cam track, and the axial guide maintains the cam components in a generally coaxial alignment. The first and second helical cam tracks contact each other and convert relative rotational movement between the cam components into relative axial movement.

In accordance with another embodiment, there is provided a helical cam device having first and second cam components and an axial guide. The first cam component has a smooth cylindrical surface and an axial end with a first helical cam track, the second cam component has a smooth cylindrical surface and an axial end with a second helical cam track, and the axial guide maintains the first and second cam components in a generally coaxial alignment and has a smooth cylindrical surface. The first and second helical cam tracks contact each other and convert relative rotational movement between the cam components into relative axial movement so that at least one of the smooth cylindrical surfaces of the first and second cam components slides along the smooth cylindrical surface of the axial guide.

In accordance with another embodiment, there is provided a method for converting rotational movement into axial movement. The method includes steps for (a) providing a first cam component with a first helical cam track, (b) providing a second cam component with a second helical cam track, (c) providing an axial guide, and (d) applying either a rotational or an axial force to at least one of the cam components, wherein the rotational force causes a relative axial movement between the cam components, and the axial force causes a relative rotational movement between the cam components.

BRIEF DESCRIPTION OF THE DRAWINGS

These and other objects, features and advantages of this invention will be apparent from the following detailed description of the preferred embodiments and best mode, the appended claims and the accompanying drawings, in which:

FIG. 1 is a perspective view of an embodiment of a helical cam device;

FIG. 2 is a plan view of a portion of the helical cam device of FIG. 1, taken along lines 2-2 with the axial guide removed;

FIG. 3 is a side view of the helical cam device portion of FIG. 2, taken along lines 3-3;

FIG. 4 is another side view of the helical cam device portion of FIG. 2, taken along lines 4-4;

FIG. 5 is a perspective view of another embodiment of a helical cam device;

FIG. 6 is a plan view of a portion of the helical cam device of FIG. 5, taken along lines 6-6;

FIG. 7 is a side view of the helical cam device of FIG. 5, and shows some interior features of the device in phantom; and;

FIG. 8 is a side view of another embodiment of a helical cam device.

DETAILED DESCRIPTION OF THE PREFERRED EMBODIMENTS

With reference to FIG. 1, there is shown an embodiment of a helical cam device 10 that can be used in a wide variety of applications including, but certainly not limited to, hinges, metal forming equipment, robotics, specialized drilling equipment, valves, mechanical switches, carburetors, transmissions, internal combustion engines, etc. Helical cam device 10 generally includes a first cam component 12, a second cam component 14 and an axial guide 16, and is designed such that relative rotational movement R between the two cam components causes them to undergo a corresponding relative axial movement A. According to a first embodiment, first cam component 12 is stationary, second cam component 14 is movable, and both cam components are aligned in a generally coaxial alignment. Moreover, first and second cam components 12 and 14 are mirror images of one another, thus the following explanation of first cam component 12 applies to second cam component 14 as well.

Referring now to FIGS. 1-4, first cam component 12 is preferably a metallic component having an exterior surface 20, an interior surface 22 that defines an axial bore 24, a first axial end 26 with a helical cam track 28, a second axial end 30, and an annular cross-sectional shape (best seen in FIG. 2). Preferably, exterior surface 20 is a smooth cylindrical surface that is circular in cross-section, however, it is possible for the exterior surface to have a non-circular cross-sectional shape such that it is square, rectangular, oval, etc. Interior surface 22 is also preferably a smooth cylindrical surface that is coaxial with exterior surface 20 and defines an axial bore 24 that is sized and shaped to receive axial guide 16. Although the interior surface 22 and axial bore 24 shown here have circular cross-sections, it is possible to provide an axial bore having a square, rectangular, oval, or some other non-circular cross-section. Axial bores having non-circular cross-sections can be used to limit the relative rotational movement between the first and/or second cam components 12, 14, which in turn limits their corresponding relative axial movement. The thickness of the first cam component wall, which is the radial distance between interior and exterior surfaces 22 and 20, is largely determined by the particular type of application in which helical cam device 10 is being utilized, but is preferably in a general range of 3 mm-200 mm.

First axial end 26 has a helical cam track 28 and is spaced from the flat-ended second axial end 30. Like the wall thickness, the axial length of first cam component 12 primarily depends on the particular application in which helical cam device 10 is being used, but is preferably in a general range of 15 mm-1,000 mm. Helical cam track 28 is designed to interact with a complementary cam track located on an opposing axial end of second cam component 14, such that relative rotational movement between the two cam components results in a corresponding relative axial movement. Helical cam track 28 generally includes four quadrant sections 40-46 (best seen in FIG. 2) which are respectively separated by four transition sections 48-54. Each quadrant section has a circumferential extent of approximately 90° and is arrange such that adjoining quadrant sections (sections 40 and 42, sections 42 and 44, sections 44 and 46, and sections 46 and 40) are inclined in a generally opposite manner from one another. For instance, quadrant section 40 is upwardly inclined from transition sections 54 to 48, while adjoining quadrant section 42 is downwardly inclined in the same direction from transition sections 48 to 50. Opposing quadrant sections (sections 40 and 44, sections 42 and 46), on the other hand, are inclined in a generally equivalent manner. For example, opposing quadrant sections 40 and 44 are both upwardly inclined when considered in the same clockwise direction. This arrangement of alternating inclined quadrants results in a cam track 28 that is up and down as one circumferentially moves around the cam track. Transition sections 48-54 are preferably rounded sections of the cam track 28 that transition from one quadrant to another. More specifically, transition sections 48 and 52 are preferably rounded peaks, where transition sections 50 and 54 are preferably rounded valleys.

Each of the quadrant sections 40-46 includes a section of cam track 28 that exhibits certain characteristics, including radial alignment, circumferential continuity and arrangement according to a helical formula. The radial alignment is best demonstrated in FIG. 1, where several radial lines 60 are shown extending at a perpendicular angle to a longitudinal axis 62. Each of these radial lines 60 contacts the surface of helical cam track 28 along the entire radial thickness of the cam track; put differently, each radial line 60 is parallel to and lies on the helical cam track surface. Accordingly, any two points located on helical cam track 28 that fall along the same radial line 60 are located at the same axial position.

With respect to the circumferential continuity, each quadrant section 40-46 preferably extends in a continuous manner across its approximately 90° such that there are no abrupt discontinuities. This continuity provides for smooth rotational movement between first and second cam components 12 and 14, as an abrupt disconnect in the cam track could impede rotation of one or more of the cam components. It is possible to intentionally provide a disconnect, such that cam components 12 and 14 could only be rotated to a predetermined position, at which point the disconnect would act as a stop and prevent further rotation.

As for the helical formula, each quadrant section 40-46 preferably has a cam track section that follows a helix; that is, for approximately 90° a cam track section can be explained in terms of a single helical formula. Using Cartesian coordinates (x, y, z) and referring to FIG. 2, each section of helical cam track 28 can generally be expressed by the following mathematical relationships:

$$x = r^* \cos(\alpha);$$

$$y = r^* \sin(\alpha), \text{ and};$$

$$z = p^* \alpha;$$

wherein (r) refers to the radius of the helical cam surface, (p) refers to the pitch (change in z dimension per rotation) of the helix, and α refers to the particular angle of the helical cam track being measured.

As an example, consider a helical cam track that has a radius (r)=20 mm and a pitch (p)=15 mm/360°, and begins at a starting point corresponding to a point (a)=(20 mm, 0 mm, 3.75 mm). According to this particular example, the starting point (a) coincides with transition section 48, which happens to be a peak on cam surface 28 (this is why the z-coordinate is 3.75 mm and not 0 mm). If one were to move 30° in the counterclockwise direction (angle $\alpha_1$) to a point (b), then the coordinates would be as follows: x=20 mm*cos(30°)=17.32 mm, y=20 mm*sin(30°)=10 mm, and z=3.75−(15 mm/360°)*30°=2.5 mm. The z-coordinate is subtracted from the initial starting elevation of 3.75 mm because quadrant 40 is declining in the counterclockwise direction. Using the same example, the coordinates of helical surface 28 at an angle $\alpha_2$ which equals 60° and corresponds to a point (c) are: x=20 mm*cos(60°)=10 mm, y=20 mm*sin(60°)=17.32 mm, and z=3.75−(15 mm/360°)*60°=1.25 mm. The same formulas apply to the entire cam surface of quadrant section 40. At an angle of 90° (corresponding with transition section 54), the coordinates of a point (d) are: x=20 mm*cos(90°)=0 mm, y=20 mm*sin(90°)=20 mm, and z=3.75−(15 mm/360°)*90°=0 mm. Accordingly, point (a)=(20 mm, 0 mm, 3.75 mm), point (b)=(17.32 mm, 10 mm, 2.5 mm), point (c)=(10 mm, 17.32 mm, 1.25 mm) and point (d)=(0 mm, 20 mm, 0 mm).

Because helical cam track 28 includes four quadrant sections that reciprocate up and down and is not a single helical structure, like a thread on a screw, the cam track preferably has four similar but different z-coordinate equations. As explained above, the z-coordinate equation for quadrant section 40 is $z = z_0 - p^* \alpha$ (where $z_0$ is starting z value at 0°). The z-coordinate equations for the remaining quadrant sections 46, 44 and 42 are: $z = z_1 + p^*(\alpha - 90°)$ ($z_1$ is starting z value at 90°), $z = z_2 - p^*(\alpha - 180°)$ ($z_2$ is starting z value at 180°), and $z = z_3 + p^*(\alpha - 270°)$ ($z_3$ is starting z value at 270°), respectively. Of course, the starting point (a)=(20 mm, 0 mm, 3.75 mm) could be a point other than transition section 48, as that point is only an arbitrary frame of reference. For instance, point (d) or transition section 54 could be used as a starting point such that all angles α are measured therefrom; in which case, the z-coordinate equations for each of the quadrants would differ from those provided above. Also, the pitch, radius, starting z values, etc. could differ from the exemplary selections used above.

Axial guide 16 is preferably a smooth, cylindrical rod that is shaped and sized to be received within the axial bores of both cam components 12 and 14. According to this embodiment, first cam component 12 is non-rotatably attached to axial guide 16 such that no relative rotational movement occurs, wherein second cam component 14 is coupled to the axial guide so that it can rotate thereabout. The length of axial guide 16 largely depends upon the particular application in which the helical cam device is being used.

In operation, helical cam device embodiment 10 is designed such that relative rotational movement R between cam components 12 and 14 causes them to undergo a corresponding relative axial movement A, and vice-versa. In the example where a spring (not shown) is used to axially bias the two cam components 12 and 14 together, rotation of second cam component 14 causes the two cam components to move with and against a torque created by the axial compression force of the spring and the shape of the opposing cam tracks. Whether the induced torque encourages or discourages such rotation is dependent on the relative position of the two cam components. For instance, when helical cam device 10 is in the orientation shown in FIG. 1 (peak to peak), the axial compression force exerted by the spring and the shape of the opposing cam tracks induces a torque on the rotatable second cam component 14. This torque encourages second cam component 14 to rotate about 90° in either the clockwise or counter-clockwise direction until there is an angular alignment of opposite cam track sections (peak to valley). At such an angular alignment, there is a minimum axial spacing or separation between cam components 12 and 14, and the torque that was encouraging the second cam component 14 to rotate is gone. In order for second cam component 14 to rotate an additional 90° in the clockwise direction, it must overcome a torque created by the spring force and the shape of the opposing cam tracks that is now discouraging rotation, as opposed to encouraging it. This can be further explained by the fact that a maximum axial spacing or separation occurs between the two cam components when there is an angular alignment of equivalent cam track sections (peak to peak); a maximum axial separation that results in a maximum compression of the spring. Thus, the torque caused by the spring and the configuration of the opposing cam tracks and exerted on the rotatable second cam component 14 reverses every 90° or so of relative rotational movement. Of course, helical cam device 10 can be operated in a clockwise and/or a counter-clockwise orientation.

It should be recognized that the shape of the helical cam tracks cause a desirable balanced heeling effect during rotation of the two cam components. When the two cam components are being rotated against an induced torque, as described above, the opposing helical cam tracks contact each other and produce a balanced heeling effect that causes the induced torque to periodically reverse in direction. For example, where the two cam components are in a peak to valley alignment and a rotational force is applied against the induced torque, the helical cam tracks contact each other over a large contact surface that generally includes the entire radial width or thickness of each cam track, as well as a substantial portion of the circumferential extent of each cam track section involved. By distributing the force that compresses the two cam components together, as opposed to having one cam track ride on the edge of another, for instance, a smoother, balanced rotation is achieved. Moreover, this balanced heeling affect occurs not only in the two opposing cam tracks just described, but also in a pair of opposing cam tracks located approximately 180° away. For example, if cam track sections 40 and an opposing section of second cam component 14 were contacting each other, then a balanced heeling effect would also be occurring in cam track sections 44 and the opposing section of cam component 14.

Turning now to FIGS. 5-7, an alternative embodiment 100 of the helical cam device is shown having a first cam component 112, a second cam component 114 and an axial guide 116. The first and second cam components are largely the same as those previously described, thus a duplicate explanation has been omitted. The axial guide, on the other hand, differs from that of the first embodiment in that guide 116 is preferably a cylindrical sleeve where axial guide 16 is a cylindrical rod. Both axial guides operate in the same general manner, as they both maintain the first and second cam components in a generally coaxial alignment so that the second cam component can rotatably move along the cam track of the first cam component. The specific length of axial guide 116 depends upon the pitch of the helical cam tracks, among other factors, as axial guide 116 should be long enough to fully encompass both helical cam tracks, regardless of their relative angular orientation.

With reference now to FIG. 8, there is shown another embodiment 200 of the helical cam device having a first cam component 212, a second cam component 214, two separate axial guides 216 and 218, and a U-joint (not shown). Again, the first and second cam components are largely the same as those previously described, however, their non-axial alignment is different. The U-joint, which could be substituted for any type of pivoting joint capable of rotatably-coupling non-axially aligned components together, couples axial guides 216 and 218 together such that cam components 212 and 214 are maintained in a non-axial alignment with an angle β formed therebetween. Preferably, angle β is in a range of about 0°-45°, and even more desirably is in the range of 0°-20°. Angles greater than about 45° can negatively impact the amount of relative axial travel (A) between the two cam components because they become almost perpendicular to one another.

Optionally, each of the previous helical cam device embodiments could include one or more of the following features. First, each of the cam device embodiments could be designed such that both cam components are movable. In such an arrangement, first cam component 12, 112, 212 could also be spring loaded and move in the rotational direction (R) and/or the axial direction (A), instead of being stationary. As will be appreciated by those skilled in the art, spring loading both cam components allows the total relative rotational and/or axial travel experienced by the cam device to be divided up between the two cam components, as opposed to having one cam component do all of the traveling. One of any number of ratios could be used for dividing the amount of rotational and/or axial travel between the cam components.

Second, one or more barrel slots 250, 252 (shown in phantom in FIG. 1) could be added to the first and/or second cam component for controlling the rotational and/or axial travel of the cam components(s). In the case of barrel slot 250, a pin or shaft 254 is attached to the axial guide 16, 116, 216 such that it protrudes through slot 250. This restricts the travel of first cam component 12, 112, 212 to rotational movement only through an angular range defined by the circumferential length of barrel slot 250. Similarly, a pin or shaft 256 is attached to axial guide 16, 116, 218 such that it protrudes through barrel slot 252 and only allows second cam component 14, 114, 214 to travel in the axial direction. More complex versions and combinations of barrel slots could be used to precisely control the path and amount of rotational and/or axial travel performed by each of the cam components. These include helical slots, stepped slots, and larger slots in the form of openings as opposed to simply being narrow grooves, to name but a few. Alternatively, grooves and bearings, such as ball bearings, could be used in place of the barrel slots and pins discussed above.

Third, each of the cam device embodiments could include one or more sets of detents 270 on the helical cam track (shown in phantom in FIG. 1) for creating a temporary stop that holds the two cam components in a specific angular orientation. Detent 270 is a small recess in one of the helical cam track peaks of second cam component 14 and is designed to receive an opposing helical cam track peak of first cam component 12. When the two cam components are rotated into a particular alignment, a peak of helical cam track 28 nests within detent 270 such that the two cam components are temporarily maintained in that position and stay there until an additional force causes the cam components to rotate out of that position. Preferably, detents are provided in pairs; that is, a similar detent (not shown) would also be provided on the other helical cam track peak of second cam component 14 at a position that is approximately 180° from detent 270. It is of course possible for detent 270 to be located at a position other than a cam track peak, as it is also possible for each cam component 12 and 14 to include one or more set(s) of detents, as will be appreciated by those skilled in the art.

Fourth, each of the cam device embodiments could include one or more sets of truncated peaks 272 (shown in phantom in FIG. 1) for affecting the axial travel during rotation of the two cam components. Truncated peak 272 can be a flat, rounded, or otherwise truncated feature located on the helical cam track of second cam component 14, and provides a dwell time for the cam components during rotation. The dwell time constitutes a period when there is either no or very little relative axial travel between the two cam components, even though the they are being rotated. As with detents, truncated peaks 272 are preferably provided in pairs, and can include any combination of flat, rounded, or other appropriate shaped features.

It will thus be apparent that there has been provided in accordance with the present invention a helical cam device, as well as a method of operation which achieve the aims and advantages specified herein. It will of course be understood that the foregoing description is only of preferred exemplary embodiments, and that the invention is not limited to the specific embodiments shown. For example, it is possible for axial ends 26 and 30 of stationary cam component 12 to each have helical cam tracks so that they each interact with another cam component. In such an arrangement, a total of three or more cam components could be generally coaxially aligned. It is also possible to provide a cam component where one or more, but not all, of the quadrant sections are aligned in the radial direction, continuous throughout their circumferential extent, and/or are arranged according to a helical formula. Likewise, it is possible for two or more quadrant sections to have differing circumferential extents and/or different helical formulas (different pitch, radius, starting z-value, etc.). Also, the helical cam device could be designed such that a spring biases the two cam components away from each other, as opposed to the examples provided above where the spring biases them towards each other. Various changes and modifications will become apparent to those skilled in the art and all such variations and modifications are intended to come within the scope of the appended claims.

The invention claimed is:

1. A helical cam device, comprising:
a first cam component having an axial end with a first helical cam track and having an opposite axial end;
a second cam component having an axial end with a second helical cam track and having an opposite axial end, wherein the axial ends with the helical cam tracks face each other and the opposite axial ends face away from each other; and
an axial guide for maintaining said first and second cam components in a generally coaxial alignment, wherein said first and second helical cam tracks contact each other along mating helical surfaces and convert relative rotational movement between said cam components into relative axial movement, the mating helical surfaces being configured to distribute forces pressing the two cam components together over the mating helical surfaces during relative movement.

2. The helical cam device of claim 1, wherein at least one of said first and second helical cam tracks includes a plurality of quadrant sections arranged such that adjoining quadrant sections are inclined in a generally opposite manner, and opposing quadrant sections are inclined in a generally equivalent manner.

3. The helical cam device of claim 2, wherein said quadrant sections are separated by rounded transition sections.

4. The helical cam device of claim 1, wherein during relative rotation of said first and second cam components, said first and second helical cam tracks contact each other and produce a balanced heeling effect that causes an induced torque to periodically reverse in direction.

5. The helical cam device of claim 1, wherein said first and second cam components each includes an axial bore for receiving said axial guide, said axial guide being a cylindrical rod.

6. The helical cam device of claim 5, wherein each of said first and second cam components has a generally annular cross-section with a wall thickness in the range of 3 mm-200 mm.

7. The helical cam device of claim 1, wherein said axial guide is a cylindrical sleeve that includes an axial bore for receiving said first and second cam components.

8. The helical cam device of claim 1, wherein said first cam component is attached to said axial guide such that it is stationary and said second cam component is coupled to said axial guide such that it is movable.

9. The helical cam device of claim 1, wherein said first and second cam components are both coupled to said axial guide such that they are both movable.

10. The helical cam device of claim 1, wherein at least one of said first and second cam components includes a barrel slot for receiving a pin.

11. The helical cam device of claim 1, wherein at least one of said first and second helical cam tracks includes a detent.

12. The helical cam device of claim 1, wherein at least one of said first and second helical cam tracks includes a truncated peak.

13. The helical cam device of claim 1, wherein at least one of said first and second helical cam tracks includes a quadrant section that is: i) aligned in a radial direction, ii) continuous throughout its circumferential extent, and iii) arranged according to the following formulas:

$$x = r^* \cos(\alpha);$$

$$y = r^* \sin(\alpha); \text{ and}$$

$$z = p^* \alpha;$$

wherein x, y and z represent coordinates of a point lying on said helical cam track(s), r represents a radius of said helical cam track(s), p represents a pitch of said helical cam track(s), and α represents an angle relating to said point.

14. A helical cam device, comprising:
a first cam component having a smooth cylindrical surface and an axial end with a first helical cam track;
a second cam component having a smooth cylindrical surface and an axial end with a second helical cam track; and an axial guide for maintaining said first and second cam components in a generally coaxial alignment and having a smooth cylindrical surface, wherein said first and second helical cam tracks contact each other along mating helical surface portions at a plurality of separate angular locations and convert relative rotational movement between said cam components into relative axial movement so that at least one of said smooth cylindrical surfaces of said first and second cam components slides along said smooth cylindrical surface of said axial guide; and wherein two of the mating helical surface portions are angularly spaced from each other by about 180 degrees and are configured to produce a balanced heeling effect with smooth and balanced movement.

15. The helical cam device of claim 14, wherein said at least one smooth cylindrical surface of said first and second cam components is an interior surface that forms an axial bore for receiving said axial guide.

16. The helical cam device of claim 14, wherein said at least one smooth cylindrical surface of said first and second cam components is an exterior surface that is received within a bore of said axial guide.

17. A method of converting rotational movement into axial movement, comprising the steps of:
(a) providing a first cam component having a first helical cam track;
(b) providing a second cam component having a second helical cam track;
(c) providing an axial guide for maintaining said first and second cam components in a generally coaxial alignment so that said first and second helical cam tracks contact each other; and
(d) applying either a rotational or an axial force to at least one of said cam components so that said first and second helical cam tracks contact each other along mating helical surfaces that are configured to distribute said rotational or axial force over the mating helical surfaces and produce a balanced heeling effect, wherein said rotational force causes a relative axial movement between said cam components, and said axial force causes a relative rotational movement between said cam components.

* * * * *